United States Patent
Koops et al.

(10) Patent No.: US 6,366,278 B1
(45) Date of Patent: Apr. 2, 2002

(54) CAMERA SYSTEM

(75) Inventors: Hans Wilfried Peter Koops, Ober-Ramstadt; Ottmar Hoinkis, Darmstadt, both of (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/424,021

(22) Filed: Nov. 17, 1999

(30) Foreign Application Priority Data

May 17, 1997 (DE) .......................................... 197 20 785

(51) Int. Cl.[7] .................................................. G09G 5/00
(52) U.S. Cl. ........................ 345/178; 345/173; 345/175; 345/176; 178/18.02; 178/18.09; 178/18.1; 359/3; 359/6; 359/30
(58) Field of Search ................................. 345/173, 175, 345/176, 178; 178/18.02, 18.09, 18.1; 359/3, 6, 30

(56) References Cited

U.S. PATENT DOCUMENTS

| 4,873,398 A | * | 10/1989 | Hubby, Jr. .................... 178/18 |
| 4,945,348 A | * | 7/1990 | Ibamoto et al. ............. 345/104 |
| 5,003,167 A | * | 3/1991 | Arques ...................... 250/208.1 |
| 5,771,039 A | * | 6/1998 | Ditzik ......................... 345/178 |
| 6,160,782 A | * | 12/2000 | Kayanuma et al. ......... 369/109 |

FOREIGN PATENT DOCUMENTS

| DE | 40 29 246 | 3/1991 |
| DE | 195 45 484 | 6/1997 |
| EP | 0 349 322 | 1/1990 |
| WO | WO 89/09959 | 10/1989 |
| WO | WO 97/21301 | 6/1997 |

* cited by examiner

*Primary Examiner*—Richard Hjerpe
*Assistant Examiner*—Henry N. Tran
(74) *Attorney, Agent, or Firm*—Kenyon & Kenyon

(57) ABSTRACT

A picture recording device includes at least one photodetector for each picture element to be recorded before which one focusing element is arranged for forming an image of each element of the picture to be recorded on the photodetector. The picture recording device is fabricated as a thin, preferably flexible sheet and, on the side facing away from the picture to be recorded, further focusing elements are arranged in such a way that light emitted from a screen having the picture recording device mounted thereon is focused in a plane situated inside or directly in front of the picture recording device, ensuring an undisturbed viewing of the picture.

11 Claims, 2 Drawing Sheets

CAMERA SYSTEM

FIELD OF THE INVENTION

The preset invention relates to a picture recording device camera system.

BACKGROUND INFORMATION

German Published Patent Application No. 195 45 484 describes a picture recording device. The picture recording device is one physical unit which is disadvantageous in many applications of a picture recording device in which a screen is already present in the form of a cathode ray tube or an LCD display.

SUMMARY OF THE INVENTION

An object of the present invention is to design a picture recording device in such a way that it can be used advantageously in front of a screen.

The object is accomplished by the present invention by using a picture recording device having at least one photodetector per picture element to be recorded, in front of which one focusing element for each element of the picture to be recorded is arranged on the photodetector, with the picture recording device being fabricated as a thin sheet which, on the side facing away from the picture to be recorded, has further focusing elements arranged in such a way that the light emitted from a screen having the picture recording device mounted thereon is focused in a plane inside or directly in front of the picture recording device. This sheet should preferably be flexible.

The picture recording device based on the present invention has an advantage that the focusing elements (focusing lenses) required for picture recording do not disturb the viewing of the picture generated on the screen.

An advantageous design of the picture recording device according to the present invention is such that the light emitted from the screen is focused in the plane of the focusing elements. With this design, the light emitted from the screen is in no way affected by the lenses needed for picture recording. However, since the screen is located behind a glass pane, which may possibly be of considerable thickness compared with the picture recording device, it may be expedient if further focusing elements have a larger area than the focusing elements, i.e., that the array formed by the further focusing elements is much coarser. As a result, each of the further focusing elements covers a larger radiation angle than would be the case with an area corresponding to the focusing elements.

Depending on the prevailing conditions, the device may be so designed that the further focusing elements are formed by one focusing lens each or that the further focusing elements are formed by two focusing lenses which are spaced apart from one another. This embodiment is especially suited for screens having a thick glass pane.

Another embodiment also adapted to such conditions is designed in such a manner that each further focusing element is assigned in the same axis to one photodetector and one focusing element, where the light emitted from the screen is preferably focused in a plane disposed between the photodetector and the plane of the focusing elements.

In a further embodiment of the picture recording device according to the present invention, the photodetectors are prevented from being exposed to the light emitted from the screen by placing an opaque layer on the side of the photodetectors facing away from the picture to be recorded, so that the light emitted from the screen does not impair the photodetectors.

Another embodiment may be used for recording color pictures and is characterized in that color filters, which permit a separation of the different colors of the light, are placed in front of the photodetectors.

An additional embodiment of the picture recording device according to the present invention provides that light emitted from the screen be reflected by an object approaching the picture recording device, to at least one of the photodetectors, and that information be obtained indicating which of the photodetectors receive reflected light. In this way, a picture recording device according to the present invention can be used together with a screen as an input unit, e.g., for a computer, where it suffices to point with one's finger or a suitable object at predefined fields (see German published Patent Application No. 195 45 484).

BRIEF DESCRIPTION OF THE DRAWINGS

Identical parts in the figures are marked with the same references.

DETAILED DESCRIPTION

Figure 1A:
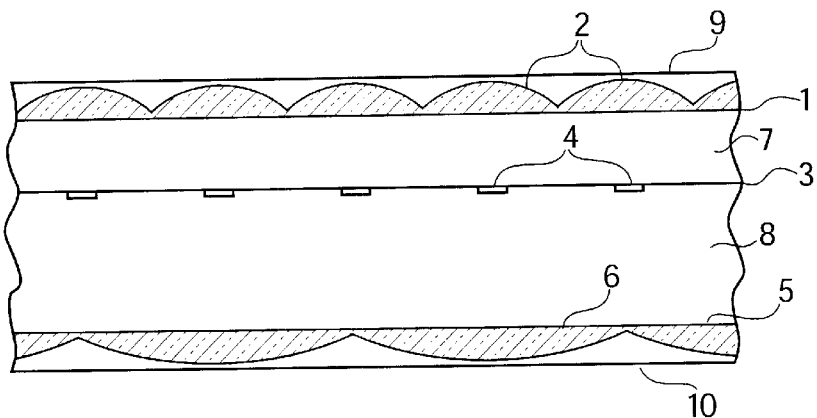
FIG. 1a shows a sectional view of a first embodiment according to the present invention.
Figure 1B:
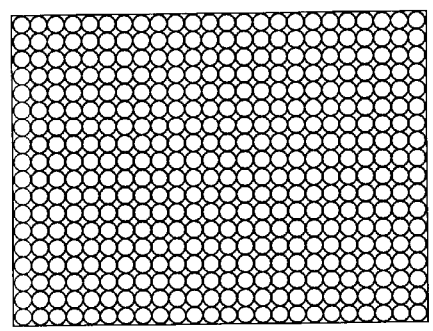
FIG. 1b shows a top view of the first embodiment.

In the example shown as a segment in FIG. 1a and as top view on a smaller scale in FIG. 1b, which has the shape of a rectangular sheet and the size of a screen, focusing lenses 2 are arranged in the form of an array in the plane directed towards the object to be recorded. In plane 3 of focusing lenses 2, there are photodetectors 4, whose area is considerably smaller than that of corresponding lens 2, so that only those rays which enter into lenses 2 in parallel are converted into electric signals. As is generally known for picture recording devices, the output signals of photodetectors 4 can be amplified and further processed. For this purpose, the photodetectors are connected, inter alia, with conducting tracks which are not shown in FIG. 1.

Figure 2:
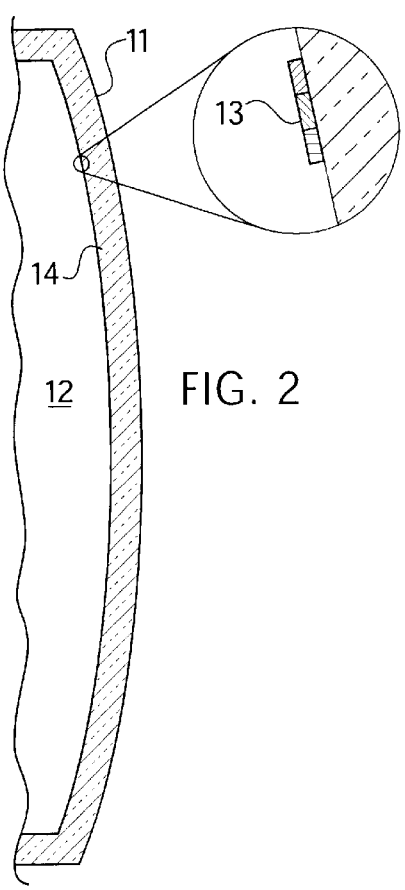
FIG. 2 shows a sectional view of a front part of a picture tube with a magnified representation of a color triad according to the present invention.
Figure 3:
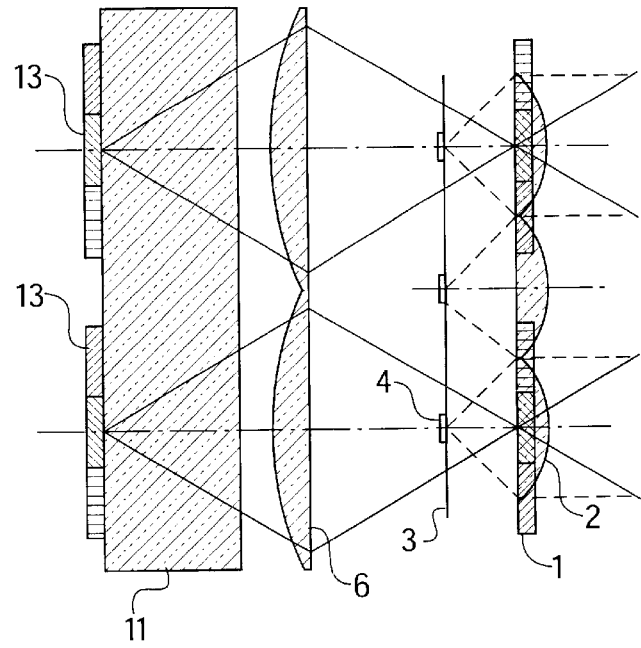
FIG. 3 shows a representation of optical conditions for the first embodiment attached to a screen according to the present invention.

In another plane 5, further focusing lenses 6 are arranged which focus the light of the screen in plane 1 and are also called reproduction lenses in the following, as is illustrated in FIGS. 2 and 3. For this light, focusing lenses 2—also called recording lenses in the following—are virtually ineffective.

The picture recording device according to the present invention can be implemented as a solid sheet or foil by using a plurality of stacked layers, where those layers used to ensure the spacing between the layers forming the lenses should have a lower dielectric constant than the lenses themselves. In addition to these intermediate layers 7 and 8, the exterior sides of the picture recording device may each be provided with another layer 9, 10 to obtain a smooth surface that is more easily kept clean. For reasons of clarity, relatively few reproduction lenses are shown in FIG. 1b. The number of recording lenses and photodetectors can be adapted to the usual resolutions used in picture recording.

FIG. 2 shows front pane 11 of a picture tube 12 having luminescent material on its interior side applied in the form of color triads 13 of the primary colors red, green, and blue, which form screen 14. For reasons of stability, front pane 11 of picture tube 12 is of considerable thickness, which has to be taken into account in dimensionally designing the picture recording device according to the present invention.

FIG. 3 schematically depicts the ray paths in the embodiment illustrated in FIGS. 1a and 1b in interaction with screen 14. To allow an undisturbed view of the screen from a relatively wide viewing angle and to substantially utilize the light emitted from screen 14, reproduction lenses 6 are designed to be larger than recording lenses 2. An image of one color triad 13 each is formed in plane 1 of recording lenses 2 so that, contrary to a color triad in plane 3 of photodetectors 4, for instance, no more imaging takes place outside, in the direction towards the viewer.

Figure 4:
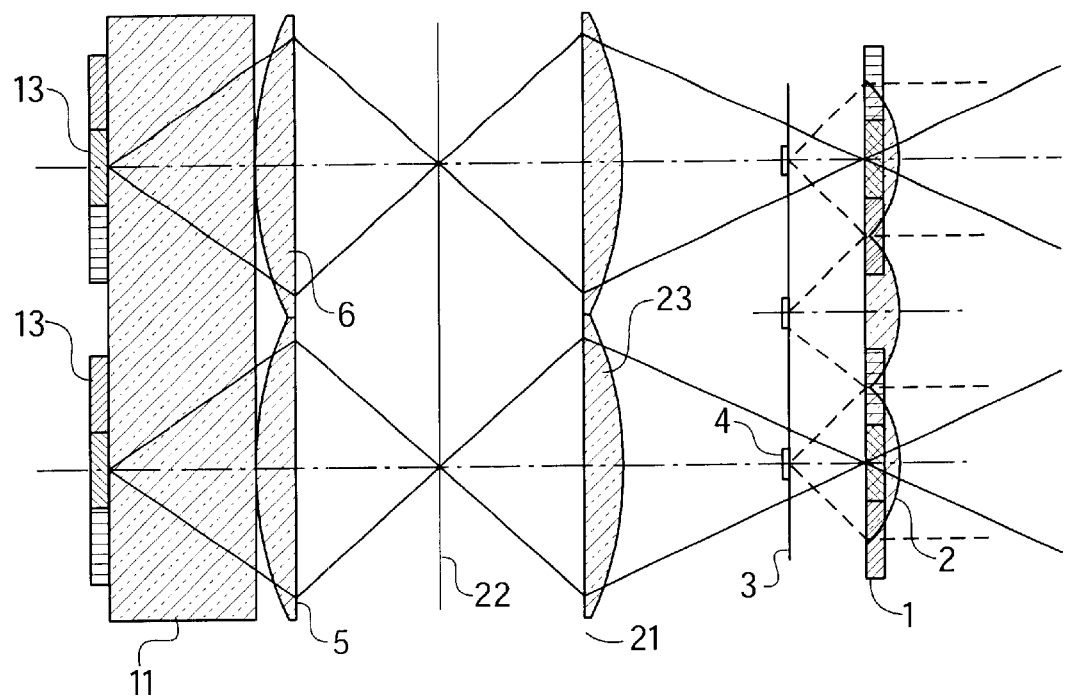
FIG. 4 shows a representation of a second embodiment according to the present invention.

In a second embodiment illustrated in FIG. 4, the reproduction lenses are provided in two planes 5, 21. Here, an image of color triads 13 is first formed in a plane 22. The image generated there is focused into plane 1 of recording lenses 2 with the aid of focusing lenses 23 in plane 21. The screen aperture angle is retained in this process.

Figure 5:
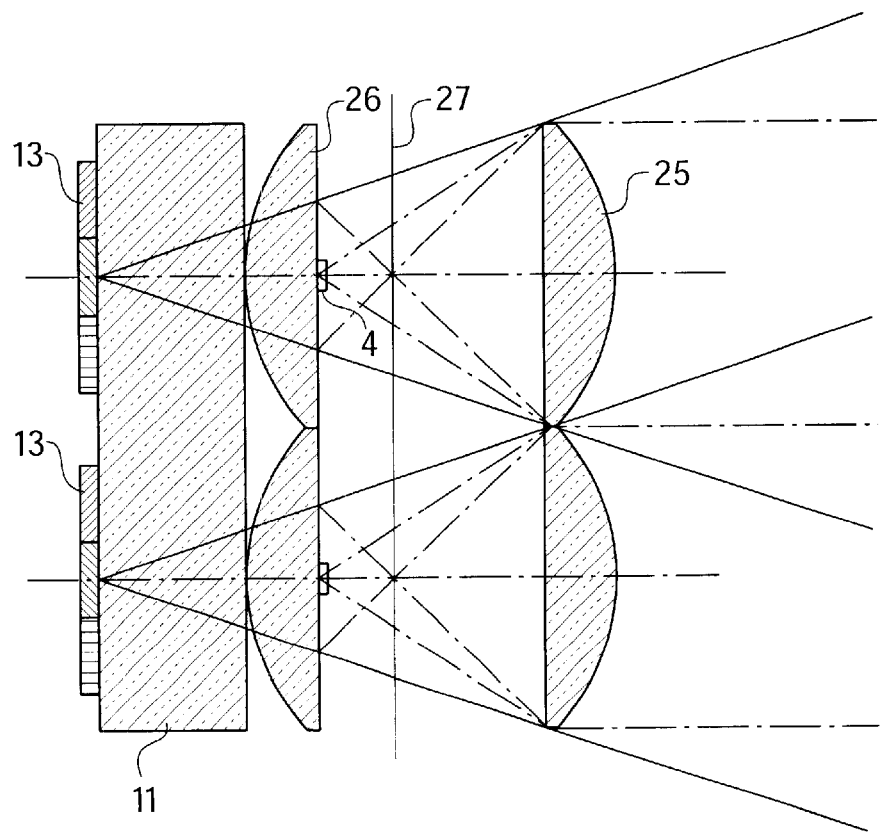
FIG. 5 shows a representation of a third embodiment according to the present invention.

A third embodiment according to the present invention is illustrated in FIG. 5 and provides only one plane of recording lenses 25 and one plane of reproduction lenses 26. In this context, one lens 25 and one lens 26 each are arranged in the same axis, so that in this embodiment, the number of recording lenses corresponds to that of the reproduction lenses.

The reproduction lenses 26 form a real image of color triads 13 in a plane 27 between the plane of recording lenses 25 and plane 3 of photodetectors 4. This reduced formation of a real image is then focused as a virtually magnified image, with the aid of lenses 25. Photodetectors 4, for their part, are placed in the focal plane of recording lenses 25. By properly selecting the layer thicknesses, the focal distance distribution over the screen, and the position of the photodetectors in plane 3 from location to location, one can adjust the viewing angle and, thus, the magnification.

What is claimed is:

1. A picture recording device arranged as a thin sheet, comprising:
    at least one photodetector for each picture element of a picture to be recorded;
    at least one focusing element being disposed in front of the at least one photodetector, the at least one focusing element forming an image of each picture element of the picture to be recorded; and
    a plurality of additional focusing elements being disposed on a side of the thin sheet facing away from the picture to be recorded such that light emitted from a screen on which the picture recording device is mounted is focused on a plane, the plane being one of situated inside of the picture recording device and situated directly in front of the picture recording device.

2. The picture recording device according to claim 1, wherein the thin sheet is flexible.

3. The picture recording device according to claim 1, wherein the light emitted from the screen is focused on a plane including the at least one focusing element.

4. The picture recording device according to claim 3, wherein each one of the plurality of additional focusing elements has a larger area than the at least one focusing element.

5. The picture recording device according to claim 1, herein each one of the plurality of additional focusing elements includes a focusing lens.

6. The picture recording device according to claim 1, wherein each one of the plurality of additional focusing elements includes a first focusing lens and a second focusing lens, the first focusing lens being spaced apart from the second focusing lens.

7. The picture recording device according to claim 1, wherein one of the plurality of additional focusing elements is aligned in a common axis with the at least one photodetector and the at least one focusing element.

8. The picture recording device according to claim 7, wherein the light emitted from the screen is focused on a plane situated between a plane including the at least one photodetector and a plane including the at least one focusing element.

9. The picture recording device according to claim 1, further comprising:
    an opaque layer being disposed on a side of the at least one photodetector facing away from the picture to be recorded, the opaque layer being disposed such that the light emitted from the screen does not disturb the at least one photodetector.

10. The picture recording device according to claim 1, further comprising:
    a plurality of color filters being disposed in front of the at least one photodetector, the at least one color filter permitting a separation of multi-color light.

11. The picture recording device according to claim 1, wherein the light emitted from the screen is reflected by an object approaching the picture recording device to the at least one photodetector, and
    wherein information is obtained pertaining to which of the at least one photodetector receives the reflected light.

* * * * *